(12) United States Patent
Nalawade et al.

(10) Patent No.: US 12,545,216 B2
(45) Date of Patent: Feb. 10, 2026

(54) WHEEL CHOCK SYSTEM

(71) Applicant: Volvo Truck Corporation, Gothenburg (SE)

(72) Inventors: Dinkar Nalawade, Bangalore (IN); Satheesha Krishna, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 490 days.

(21) Appl. No.: 18/076,570

(22) Filed: Dec. 7, 2022

(65) Prior Publication Data

US 2023/0303040 A1 Sep. 28, 2023

(30) Foreign Application Priority Data

Mar. 28, 2022 (EP) .................................... 22164807

(51) Int. Cl.
| | |
|---|---|
| *B60T 3/00* | (2006.01) |
| *B60T 13/74* | (2006.01) |
| *B60T 7/08* | (2006.01) |

(52) U.S. Cl.
CPC .............. *B60T 3/00* (2013.01); *B60T 13/746* (2013.01); *B60T 7/08* (2013.01); *B60T 2210/20* (2013.01); *B60T 2220/04* (2013.01); *B60T 2250/00* (2013.01); *B60T 2250/04* (2013.01)

(58) Field of Classification Search
None
See application file for complete search history.

(56) References Cited

U.S. PATENT DOCUMENTS

| 1,653,420 | A | | 12/1927 | Koolbergen | |
|---|---|---|---|---|---|
| 2,182,044 | A | * | 12/1939 | Ackerman | ................ B60T 3/00 |
| | | | | | 188/4 R |
| 3,086,619 | A | * | 4/1963 | Grotz | ........................ B60T 3/00 |
| | | | | | 188/4 R |
| 3,305,049 | A | * | 2/1967 | Willey | ................. B65G 69/005 |
| | | | | | 188/32 |

(Continued)

FOREIGN PATENT DOCUMENTS

| CN | 113771808 A | 12/2021 |
|---|---|---|
| DE | 3728515 A1 | 3/1989 |

(Continued)

OTHER PUBLICATIONS

KR101970053B1—English Machine Translation (Year: 2019).*
Extended European Search Report for European Patent Application No. 22164807.4, mailed Sep. 30, 2022, 5 pages.

*Primary Examiner* — Melanie Torres Williams
(74) *Attorney, Agent, or Firm* — Withrow & Terranova, PLLC

(57) ABSTRACT

A wheel chock system. In one aspect of the invention, an actuator is configured to move a pair of wheel chocks to an activated position in which motion of the wheel is prevented. A control unit controls the actuator and, based upon determination that a plurality of predefined conditions are met, the control unit may after having received an operator-initiated activation request, cause the actuator to move the wheel chocks from the inactivated position to the activated position. In another aspect of the invention, the actuator comprises a bi-directional motor and a gear mechanism, for moving the wheel chocks to the activated position. The invention also relates to a vehicle comprising a wheel chock system.

15 Claims, 5 Drawing Sheets

(56) References Cited

U.S. PATENT DOCUMENTS

| | | | |
|---|---|---|---|
| 3,517,776 A | 6/1970 | Corti et al. | |
| 8,528,929 B2* | 9/2013 | Kimener | B65G 69/003 |
| | | | 280/476.1 |
| 2013/0306411 A1 | 11/2013 | Hussain | |
| 2017/0259792 A1* | 9/2017 | Austin | B60T 3/00 |
| 2017/0369041 A1* | 12/2017 | Breakfield | B60T 3/00 |
| 2020/0122693 A1* | 4/2020 | Dolan | F16D 65/02 |

FOREIGN PATENT DOCUMENTS

| | | | |
|---|---|---|---|
| GB | 302421 A | * | 9/1928 |
| KR | 101970053 B1 | * | 8/2019 |

* cited by examiner

WHEEL CHOCK SYSTEM

RELATED APPLICATIONS

The present application claims priority to European Patent Application No. 22164807.4, filed on Mar. 28, 2022, and entitled "WHEEL CHOCK SYSTEM," which is incorporated herein by reference in its entirety.

TECHNICAL FIELD

The invention relates to a wheel chock system. The invention also relates to a vehicle comprising such a wheel chock system.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

Wheel chocks are used for preventing accidental movement of a vehicle. Wheel chocks are placed against the wheels of the vehicle in addition to setting the brakes, and thus provide an extra safety measure to prevent the vehicle from inadvertently moving.

As of today, the wheel chocks are mounted randomly at different locations on different vehicles. For instance, they may be mounted on the load body, in a tool box, or in some other location. Sometimes they are even left at the workshop. The wheel blocks are therefore often not conveniently accessible for the driver when they are needed during occasions such as daily checks under the chassis, breakdown maintenance, replacing the tyres or any other parts, cab tilting, etc. The driver often uses some other hard structures for the purpose when wheel chocks are not available on the vehicle. Parking brakes are not always 100% reliable due to chances of pneumatic failure. Due to these various reasons, sometimes drivers are compromising on their safety as well as vehicle safety.

It would therefore be desirable to provide a solution which reduces the potential safety risks of today's handling of wheel chocks.

SUMMARY

An object of the invention is to provide a wheel chock system which at least partly alleviates the above mentioned drawbacks. This and other objects, which will become apparent in the following disclosure, are achieved by a wheel chock system as presented in the accompanying independent claims. The dependent claims present some non-limiting exemplary embodiments.

According to a first aspect of the present invention, there is provided a wheel chock system, comprising:
- a pair of wheel chocks for preventing motion of a wheel of a vehicle,
- an actuator configured to move said pair of wheel chocks from an inactivated position in which the wheel chocks do not prevent wheel motion, to an activated position in which one of said pair of wheel chocks prevents forward motion of the wheel and the other one of said pair of wheel chocks prevents rearward motion of the same wheel,
- a control unit for controlling the actuator, wherein the control unit is configured to:
  - receive an operator-initiated activation request when said pair of wheel chocks is in the inactivated position,
  - determine that a plurality of predefined conditions are met, and
  - upon determination that the plurality of predefined conditions are met and the operator-initiated activation request has been received, cause the actuator to move the wheel chocks from the inactivated position to the activated position.

By allowing the driver to send an activation request signal to a control unit, which double-checks that certain predefined conditions are met before activating the wheel chocks, a convenient and secure handling of wheel chocks is accomplished.

The operator-initiated activation request may suitably be sent from inside the driver cabin, for example via any suitable user interface, such as a graphical user interface, a button, a lever, voice command, etc. This is advantageous since it increases driver safety, and is easy to use for the driver. This automated process after the driver-initiated activation request avoids the need for the driver to go outside in order to apply the wheel chocks. Nevertheless, although enabling a driver to apply the wheel chocks while staying inside the cabin, it should be understood that the general inventive concept is not limited to this. In other exemplary embodiments the user interface may be located on the outside of the vehicle. In some exemplary embodiments, it is even conceivable that the driver may send an operator-initiated activation request signal to the control unit from a mobile device, such as a cellular phone, irrespectively if the driver is inside or outside the cabin.

It should be understood that the control unit may perform its steps in different order than listed above. For instance, in at least some exemplary embodiments it may check the predefined conditions after receiving the activation request, while in other exemplary embodiments it may constantly checking or repeatedly polling if the predefined conditions are met (i.e. even before receiving the activation request). In other exemplary embodiments, the control unit may receive the activation request and check the predefined conditions simultaneously.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

From the above, it should also be understood, that in the activated position, in practice, one of the wheel chocks may be placed at the front side of the wheel, while the other one of the wheel chocks may be placed at the rear side of the same wheel. However, the wheel chock system may suitably comprise more than one pair of wheel chocks. For example, the control unit may suitably control one pair of wheel chocks for a left wheel and another pair of wheel chocks for a right wheel (the left and right wheels normally being provided on a common wheel axle). In such case, there may suitably be one actuator which moves the wheel chocks on the left wheel and another actuator which moves the wheel chocks on the right wheel. Both actuators may in such case be controlled by the control unit.

According to at least one exemplary embodiment, said plurality of predefined conditions comprise:
that the vehicle speed is zero, and
that a brake has been engaged.

By making sure that the vehicle is at a standstill, i.e. zero speed, and that a brake has been properly engaged, the pair of wheel chocks may safely be moved to the activated position. The brake may be a service brake or a parking brake. A parking brake is preferred, but in an emergency situation if the parking brake is malfunctioning, then it may be advantageous if the control unit considers an applied service brake as fulfilling the engaged brake condition.

According to at least some exemplary embodiments, said predefined conditions may include that the propulsion power for driving a drive shaft or wheels of the vehicle has been turned off. For instance, the control unit may check that the internal combustion engine or any other propulsion motor is turned off before controlling the actuator to move the pair of wheel chocks to the activated position. This provides an additional safety measure.

From the above, it can be understood that in some exemplary embodiments, said predefined conditions may include at least three predefined conditions:
that the vehicle speed is zero, and
that a brake (suitably the parking brake) has been engaged, and
that the propulsion power for driving a drive shaft or wheels of the vehicle has been turned off.

From the above, it can also be understood that the control unit may suitably be configured to receive different electronic signals to determine whether or not the predefined conditions have been met. The control unit may have a communication interface for wireless communication or wired communication for receiving such signals. Thus, control unit may suitably be configured to:
receive input signals indicative of whether or not said predefined conditions are being met,
receiving a request signal representing said operator-initiated activation request, and
based on the received input signals and the request signal, send an actuator signal to the actuator to cause the actuator to move the wheel chocks from the inactivated position to the activated position.

For instance, if one of said predefined conditions is that the vehicle should be at zero speed (standstill), then the control unit may check that a zero speed signal from a speed sensor is received. Similarly, the control unit may receive an input signal indicating that the propulsion power is switched off and/or an input signal indicating that a brake has been engaged.

According to at least one exemplary embodiment, the control unit is configured to:
receive a road gradient signal indicative of the gradient of the road on which the vehicle is standing, and
upon determination by the control unit that the gradient is above a predetermined limit, send an alert signal to a driver interface for alerting the driver of the possibility to activate the wheel chocks or automatically cause the actuator to move the wheel chocks from the inactivated position to the activated position provided that said plurality of predefined conditions are met.

By alerting the driver, or by automatically activating the wheel chocks (in case the predefined conditions are met), when the vehicle is standing in a slope, an additional safety measure is conveniently provided.

It should be understood that the wheel chock system may suitably also be automated for the reverse process, i.e. when it is time to move the pair of wheel chocks form the activated position back to the inactivated position. Similarly to above, this may be triggered by an inactivation request signal from the driver. Thus, according to at least some exemplary embodiments, the control unit may be configured to:
receive an operator-initiated inactivation request when said pair of wheel chocks is in the activated position,
upon receipt of the operator-initiated inactivation request, cause the actuator to move the wheel chocks from the activated position to the inactivated position.

Thus, the driver can conveniently trigger the activation and inactivation of the wheel chocks without any manual handling of the wheel chocks.

Although it should be understood that there are numerous conceivable types of actuators which could be implemented within the general inventive concept and be controlled by a control unit, as well as numerous different mechanisms for moving the pair of wheel chocks between the inactivated position and the activated position, some exemplary embodiments will be presented below.

According to at least some exemplary embodiments, the inactivated position is at a higher vertical level than the activated position, wherein the actuator is configured to move said pair of wheel chocks at least partly in the vertical direction. In this context vertical should be regarded with respect to the ground on which the vehicle stands. For example, the yaw axis of the vehicle extends in the vertical direction. Accordingly, the inactivated position is further from the ground than the activated position. Indeed in the activated position, the wheel chocks should be in contact with the ground. The wheel chocks may be conveniently held/stored in the raised inactivated position, without obstructing the normal functioning of the wheels and the vehicle.

According to at least some exemplary embodiments, the actuator may be configured to move said pair of wheel chocks at least partly in the horizontal direction. Suitably, this may be achieved in combination with a movement partly in the vertical direction. In particular, the actuator may suitably be configured to move each wheel chock along a respective path forming an arc of a circle.

The actuator may suitably comprise a motor for moving the wheel chock. Although it is conceivable to have one motor for activating the wheel chocks and one motor for inactivating the wheel chocks, in at least some exemplary embodiments the wheel chock system may comprise a bi-directional motor for enabling movement from the inactivated position to the activated position, and vice versa. This is at least partly reflected in the following exemplary embodiment.

According to at least one exemplary embodiment, the actuator comprises a bi-directional motor and a gear mechanism, wherein the bi-directional motor is configured to, via the gear mechanism, simultaneously:
move one of said pair of wheel chocks to the activated position, at a front side of a tyre carried by the wheel at the tyre-ground interface, and
move the other one of said pair of wheel chocks to the activated position, at a rear side of the tyre at the tyre-ground interface.

By using one motor and a gear mechanism for moving a front wheel chock as well as a rear wheel chock simultaneously the pair of wheel chocks can be provided in the activated position in an efficient manner. Similarly, the motor may, via the gear mechanism, suitably be configured to move the pair of wheel chocks simultaneously back to the inactivated position when the control unit controls the actuator to do so.

According to at least one exemplary embodiment, the gear mechanism comprises a pair of strips having teeth, wherein each wheel chock of said pair of wheel chocks is connected to a respective one of said pair of strips, wherein movement from the inactivated position to the activated position is caused by the motor setting the gear mechanism in motion such that one strip of said pair of strips is moved along a curved path following the circumference of the front side of the tyre while the other strip of said pair of strips is moved along a curved path following the circumference of the rear side of the tyre.

By using a gear mechanism which comprises strips that are fed in opposite circular directions, and efficient and yet elegantly simple activation may be achieved. The strips may be made relatively light-weight. As should be understood, since each strip has teach each strip may be configured as a rack-like strip.

According to at least one exemplary embodiment, the wheel chocks are connected to end portions of the respective strips. Hereby, as the strips are moved along their respective curved paths, the wheel chocks will arrive at the ground without the strips or any other part of the gear mechanism risking reaching ground contact. In at least some exemplary embodiments, each wheel chock is fixedly connected to its associated strip so that relative rotation/pivoting between the wheel chock and the strip is avoided.

In at least some exemplary embodiments, each wheel chock may, when moving from the inactivated position to the activated position (or vice versa), be rotated relative to the ground. For instance, each wheel chock may, when moving from the activated position to the inactivated position (or vice versa), rotate approximately 90° relative to the ground. For instance, each wheel chock may comprise a ground contacting surface which faces and is in contact with the ground when the wheel chock is in the activated position, wherein said ground contacting surface faces towards the front or rear of the vehicle when the wheel chock is in the inactivated position.

Suitably, for the front wheel chock (i.e. the wheel chock configured to prevent forward motion of the vehicle), such a ground contacting surface may face in the forward direction of the vehicle when the wheel chock is in the inactivated position. Similarly, for the rear wheel chock (i.e. the wheel chock configured to prevent rearward motion of the vehicle), such a ground contacting surface may face in the rearward direction of the vehicle when the wheel chock is in the inactivated position.

According to at least one exemplary embodiment, the gear mechanism further comprises a worm wheel and a worm shaft, wherein the bi-directional motor is configured to rotate the worm wheel which in turn rotates the worm shaft, wherein the worm shaft moves vertically when being rotated by the worm wheel, the vertical motion of the worm shaft being transferred to said pair of strips. Thus, by this mechanism, the strips will in addition to following said curved path also form a vertical movement. This allows the wheel chocks have sufficient vertical separating distance from the tyre when the wheel chocks are in the inactivated position, thereby avoiding undesirable interference with the tyre.

According to at least one exemplary embodiment, the wheel chock system further comprises a nut in threaded engagement with the worm shaft, wherein the nut is configured to be fixedly attached to a chassis of the vehicle, wherein when the worm shaft rotates relative to the nut, the worm shaft moves vertically relative to the nut. Since the nut can be fixedly attached to the chassis, the worm shaft will be able to travel vertically relative to the chassis.

According to at least one exemplary embodiment, the gear mechanism further comprises a strip-engaging gear part which is fixedly connected to the worm shaft or which forms part of the worm shaft,
  wherein the strip-engaging gear part follows the rotating and vertical movements of the shaft,
  wherein the strip-engaging gear part is engaged with the teeth of each strip,
  wherein when the strip-engaging gear part rotates, the strips are fed along the respective ones of said curved paths.

The two strips may suitably be provided on opposite sides of the strip-engaging gear part, whereby the rotation of the strip-engaging gear part causes one of the strips to move in one direction while the other one of the strips is moved in the opposite direction.

In at least some exemplary embodiments, the wheel chock system may comprise a casing which may be provided as one part or as two casing parts (one for each strip). The casing may suitably be curved and function as a guide for the strips when they are being fed so as to move the pair of wheel chocks from the inactivated position to the activated position, or vice versa. Thus, the casing may suitably at least partly define said curved paths of the strips.

In at least some exemplary embodiments the casing may suitably house said pair of strips in the inactivated position of said pair of wheel chocks.

According to at least one exemplary embodiment, the wheel chock system may comprise a bearing providing support to said pair of strips and to the strip-engaging gear part, wherein the bearing follows the vertical movements of the strip-engaging gear part. This is advantageous as the bearing may hold the entire package together and allow the vertical motion to be performed in a controlled manner.

According to a second aspect of the present invention, there is provided a wheel chock system comprising:
  a pair of wheel chocks for preventing motion of a wheel of a vehicle,
  an actuator configured to move said pair of wheel chocks from an inactivated position in which the wheel chocks do not prevent wheel motion, to an activated position in which one of said pair of wheel chocks prevents forward motion of the wheel and the other one of said pair of wheel chocks prevents rearward motion of the same wheel,
wherein the actuator comprises a bi-directional motor and a gear mechanism, wherein the bi-directional motor is configured to, via the gear mechanism, simultaneously:
  move one of said pair of wheel chocks to the activated position, at a front side of a tyre carried by the wheel at the tyre-ground interface, and
  move the other one of said pair of wheel chocks to the activated position, at a rear side of the tyre at the tyre-ground interface.

By having a bi-directional motor which, via a gear mechanism, is configured to move the pair of wheel chocks from the inactivated position to the activated position manual handling of the wheel chocks can be avoided, thereby increasing driver and vehicle safety. It should be understood that the wheel chock system may be implemented as an automated or semi-automated system.

Suitably, the wheel chock system according to the second aspect may comprise a control unit as disclosed in connection with the wheel chock system according to the first aspect. Such a control unit may thus operate in the same manner as described above and, based on an operator-initiated activation request and double-checking that the predefined conditions are met, the control unit may control the actuator to move the wheel chocks as already explained. Furthermore, the gear mechanism of the actuator in the wheel chock system according to the second aspect may suitably be configured as discussed above in connection with the wheel chock system according to the first aspect.

Thus, it should be understood that, in a general sense, the wheel chock system according to the second aspect may comprise any one of the features and components that have been disclosed above in connection with the discussion of the wheel chock system according to the first aspect.

According to a third aspect of the present invention there is provided a vehicle comprising a wheel chock system according to the first aspect or a wheel chock system according to the second aspect, including any embodiments thereof. The advantages of the vehicle according to the third aspect are largely analogous to the advantages of the wheel chock system according to the first and/or second aspects, including the any embodiments thereof.

Generally, all terms used in the claims are to be interpreted according to their ordinary meaning in the technical field, unless explicitly defined otherwise herein. All references to "a/an/the portion, element, apparatus, component, arrangement, device, means, etc." are to be interpreted openly as referring to at least one instance of the portion, element, apparatus, component, arrangement, device, means, etc., unless explicitly stated otherwise. Further features of, and advantages with, the teachings of the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
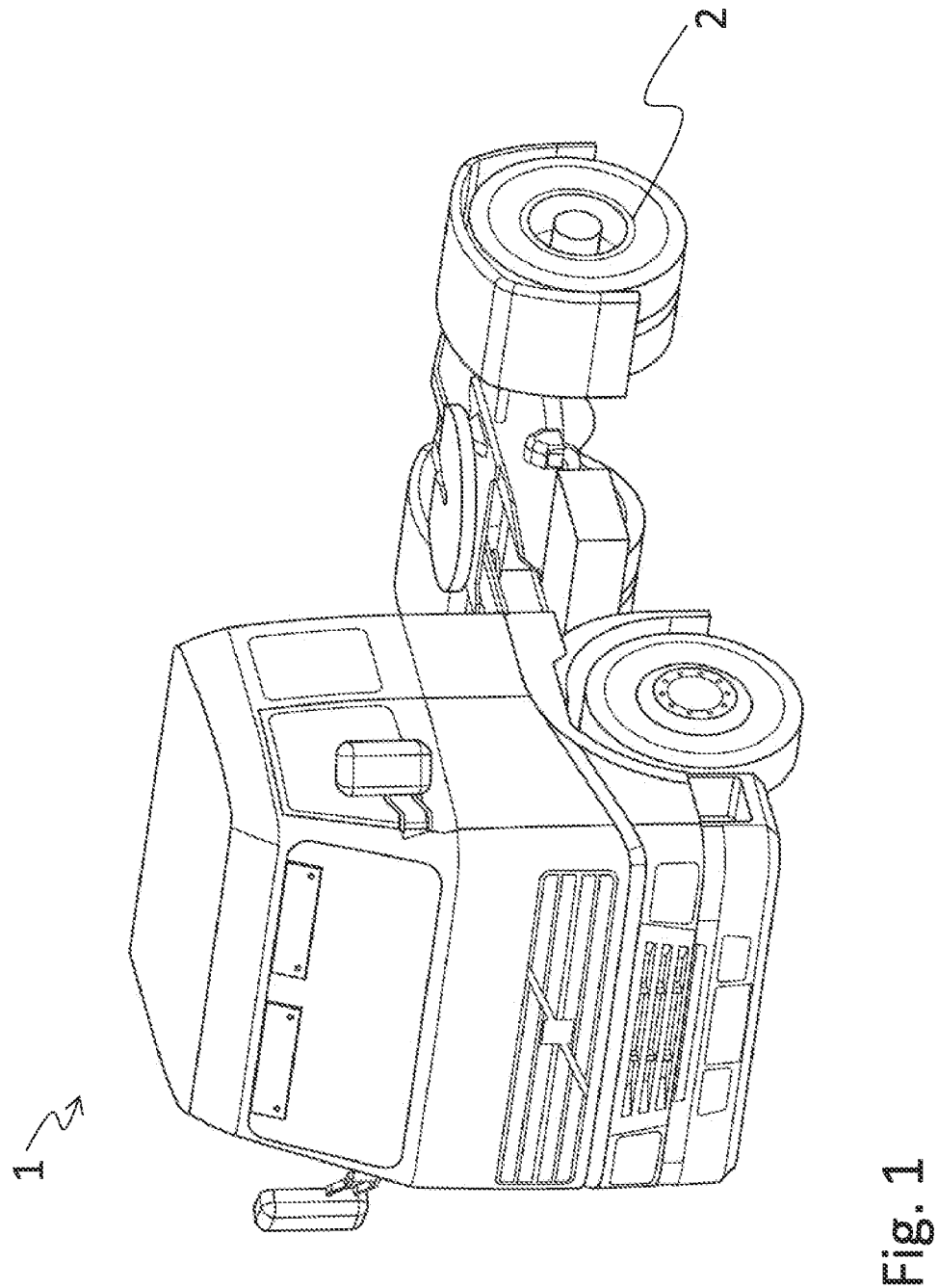
FIG. 1 illustrates a vehicle according to at least one exemplary embodiment of the invention.

The general inventive concept will now be described more fully hereinafter with reference to the accompanying drawings, in which certain aspects are shown. The general inventive concept may, however, be embodied in many different forms and should not be construed as limited to the embodiments and aspects set forth herein; rather, the embodiments are provided by way of example so that this disclosure will be thorough and complete, and will fully convey the scope to those skilled in the art. Accordingly, it is to be understood that the present general inventive concept is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 1 according to at least one exemplary embodiment of the present disclosure. The exemplary illustration in FIG. 1 shows a heavy-duty vehicle 1. More specifically FIG. 1 shows a vehicle in the form of a tractor unit for towing a trailer unit (not shown), which together may make up a semitrailer vehicle. However, the teachings of the present disclosure are applicable to other types of vehicles as well. For instance, the vehicle may be a different type of vehicle for cargo transport, such as a truck, or a truck with a dolly unit arranged to tow a trailer unit, etc. Other exemplary vehicles include buses, construction equipment, and even passenger cars.

The illustrated vehicle 1 is supported on wheels 2, some of which are driven wheels. The front wheels may suitably be steered wheels. At least some of the wheels 2, for example the wheels at the rear axle, may be associated with a wheel chock system according to the present inventive concept. The wheel chock system is not shown in FIG. 1, but will be discussed in more detail in connection with the following figures.

Figure 2:
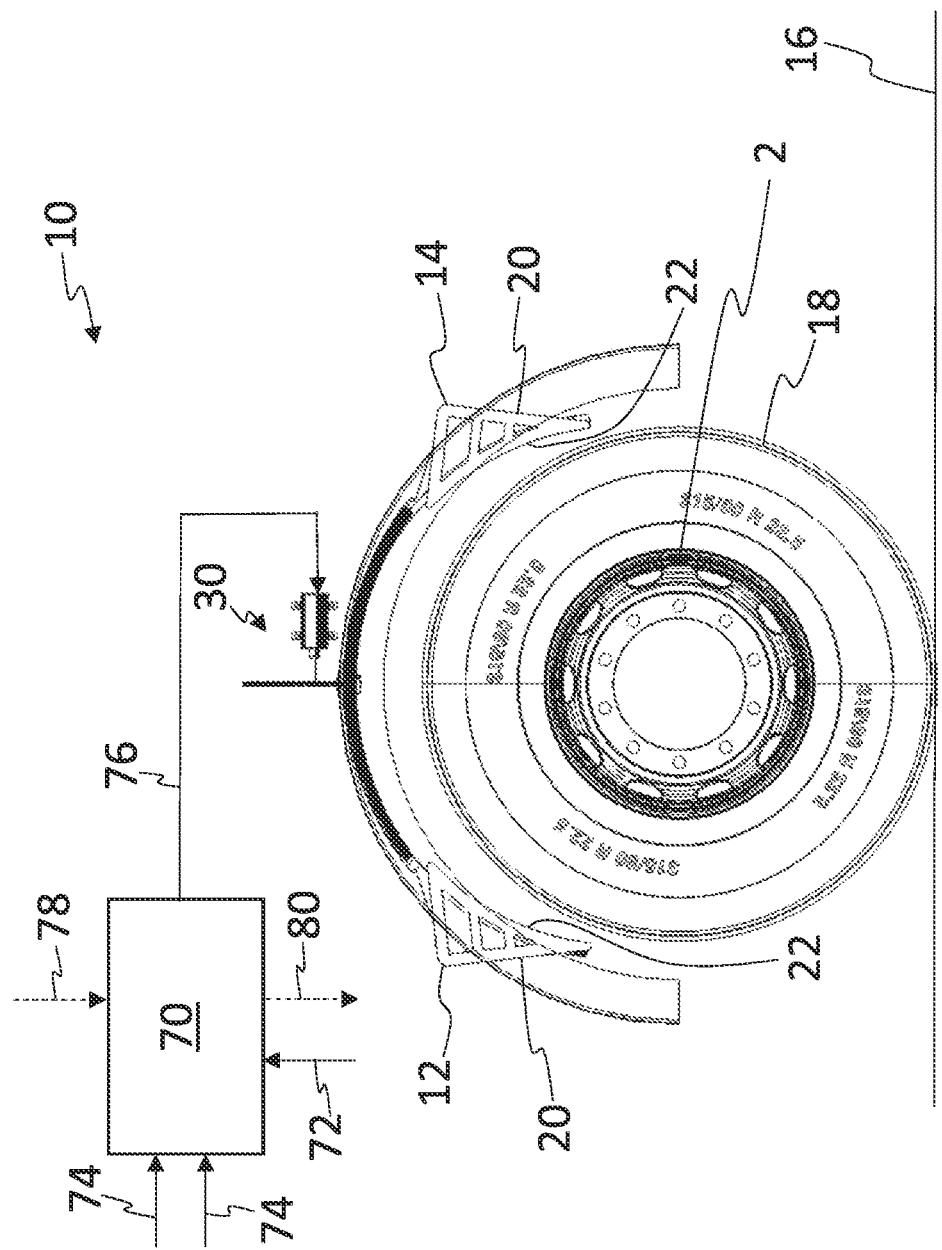
FIG. 2 illustrates schematically a wheel chock system according to at least one exemplary embodiment of the invention.

FIG. 2 illustrates schematically a wheel chock system 10 according to at least one exemplary embodiment of the invention. The wheel chock system 10 comprises a pair of wheels chocks 12, 14. In FIG. 2 the pair of wheel chocks 12, 14 is in an inactivated position. The pair of wheel chocks 12, 14 thus comprises a first or front wheel chock 12 and a second or rear wheel chock 14. In the illustrated state, i.e. in the inactivated position, the wheel chocks 12, 14 are elevated from the ground 16 and spaced from a tyre 18 of a wheel 2 which they may later prevent from moving when the wheel chocks 12, 14 have been switched to an activated position. Each wheel chock 12, 14 may have a ground contacting surface 20 for contacting the ground 16 when the wheel chock 12, 14 is in the activated position, and a tyre contacting surface 22 for contacting the tyre 18 when the wheel chock 12, 14 is in the activated position. In the inactivated position, the ground contacting surface 20 may suitably face in another direction than in the activated position. For instance, as illustrated in FIG. 2, the ground contacting surface 20 is in in the inactivated position almost perpendicular to the ground 16, whereas it will be readily understood that in the activated position the ground contacting surface 20 will be parallel to the ground 16. Thus, it should be understood that the wheel chocks 12, 14 may be subjected to rotation as well as lowering relative to the tyre 18.

Figure 3:
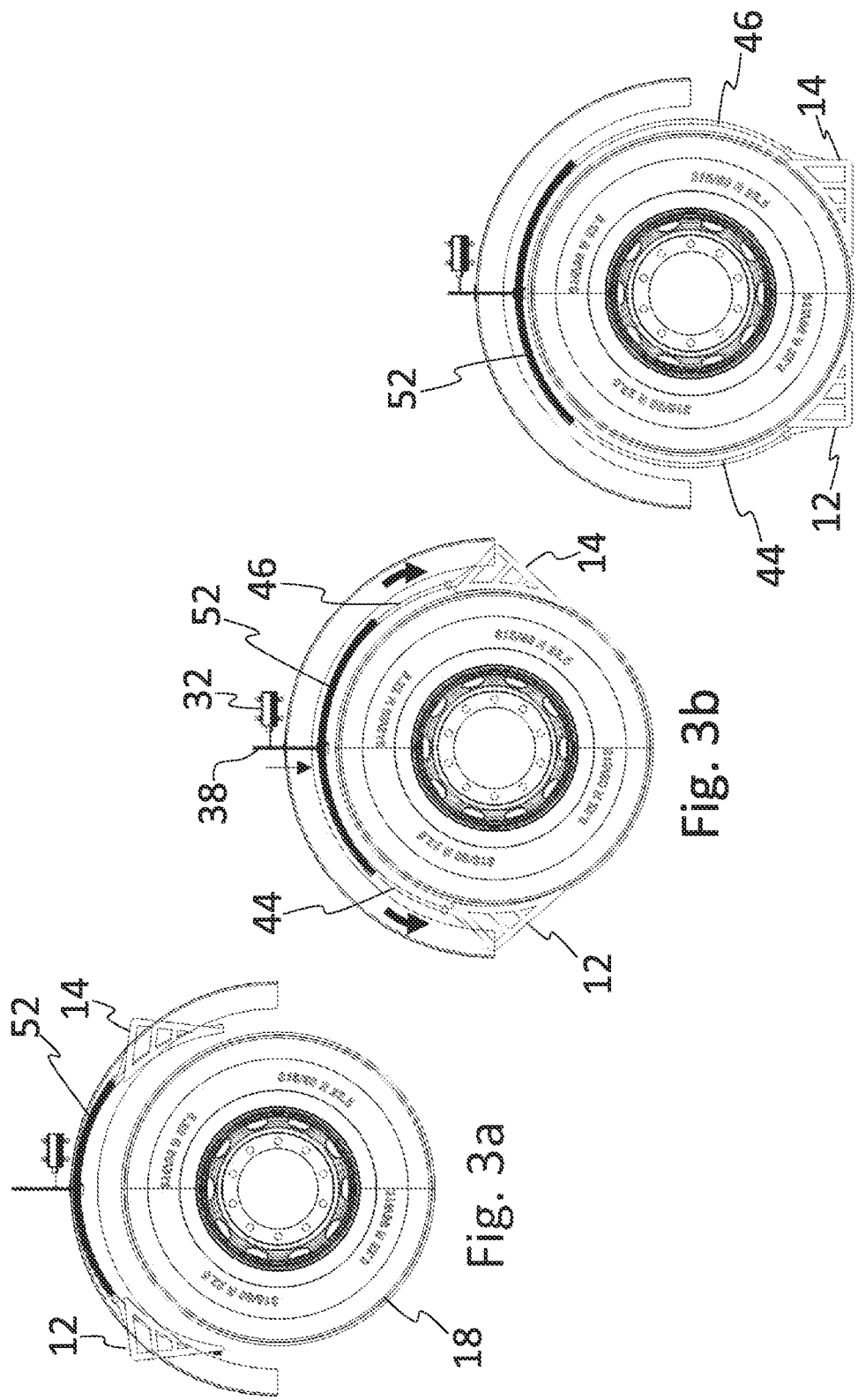
FIGS. 3a-3c illustrate schematically a sequence in which a pair of wheel chocks are moved from an inactivated position to an activated position, in accordance with the teachings of the present disclosure.

The above mentioned rotation and lowering of the wheel chocks 12, 14 relative to the tyre 18 are clearly visible in the sequence illustrate in FIG. 3a-3c. More, specifically FIGS. 3a-3c illustrate schematically a sequence in which a pair of wheel chocks 12, 14 is moved from an inactivated position to an activated position, in accordance with the teachings of the present disclosure. In FIG. 3a the wheel chocks 12, 14 are in the inactivated position. In FIG. 3b, the wheel chocks 12, 14 are already on their way towards the activated position, and they have covered approximately half their travelling distance. In FIG. 3c, the wheel chocks 12, 14 have finally reached the activated position. It should be understood that when the wheel chocks 12, 14 are inactivated the reverse sequence is performed, as the wheel chocks 12, 14 move from the activated position (FIG. 3c) to the inactivated position (FIG. 3a) via the intermediate position shown in FIG. 3b. In such a reverse sequence the wheel chocks 12, 14 will display a rotational and lifting movement relative to the tyre 18.

Turning back to FIG. 2, the wheel chock system 10 further comprises an actuator 30 configured to move said pair of wheel chocks 12, 14 from the illustrated inactivated position, in which the wheel chocks 12, 14 do not prevent wheel motion, to an activated position, in which the front wheel chock 12 prevents forward motion of the wheel 2 and the rear wheel chock 14 prevents rearward motion of the same wheel 2.

The wheel chock system 10 also comprises a control unit 70 for controlling the actuator 30. The control unit 70 is configured to receive an operator-initiated activation request 72 when the wheel chocks 12, 14 are in the inactivated position. Suitably, a driver may push a button, a lever, an icon on a display, or use any other suitably user interface, to send the operator-initiated activation request 72 to the control unit 70. The activation request 72 may be sent to the control unit 70 in the form of a digital signal. The control unit 70 is also configured to determine that a plurality of predefined conditions 74 are met. This may, for example, be achieved by the control unit 70 receiving input signals related to said predefined conditions 74. As long as at least one of those received input signals is representative of one of the predefined conditions 74 not being met, the control unit 70 will refrain from carrying out the activation request 72 from the driver. However, upon determination by the control unit 70 that the plurality of predefined conditions 74 are met and the operator-initiated activation request 72 has been received, the control unit 70 will cause the actuator 30 to move the wheel chocks 12, 14 from the inactivated position to the activated position. Suitably, the control unit 70 may send a digital actuation signal 76 to the actuator 30 to cause the actuator 30 to perform its operation.

As has been explained previously in this disclosure, said plurality of predefined conditions 74 may comprise that the vehicle speed is zero and that a brake (such as the parking brake) has been engaged. The value of the vehicle speed may be provided by a speed sensor, the engagement of the parking brake may be provided by a parking brake sensor. Although only two predefined conditions 74 have been indicated in FIG. 2, it should be understood that in at least some exemplary embodiments there may be more predefined conditions that should be met before the control unit 70 acknowledges the activation request 72 of the driver to activate the wheel chocks 12, 14. For instance, another predefined condition may be the engine of the vehicle or other propulsion motor of the vehicle is turned off. In a more general sense, a predefined condition may be that the propulsion power for driving a drive shaft and/or wheel of the vehicle has been turned off. As illustrated with the dashed arrow, in some exemplary embodiments, the control unit may optionally be configured to receive a road gradient signal 78 indicative of the gradient of the road on which the vehicle is standing. Upon determination by the control unit 70 that the gradient is above a predetermined limit, the control unit 70 may send an alert signal 80 to a driver interface for alerting the driver of the possibility to activate the wheel chocks 12, 14 or automatically cause the actuator 30 to move the wheel chocks 12, 14 from the inactivated position to the activated position provided that said plurality of predefined conditions 74 are met.

It should be understood that the control unit 70 may suitably be configured to receive an operator-initiated inactivation request when the pair of wheel chocks 12, 14 is in the activated position (as illustrated in FIG. 3c). Upon receipt of the operator-initiated inactivation request, the control unit 70 may cause the actuator 30 to move the wheel chocks 12, 14 from the activated position (FIG. 3c), via the intermediate position (FIG. 3b), to the inactivated position (FIG. 3a).

Figure 4:
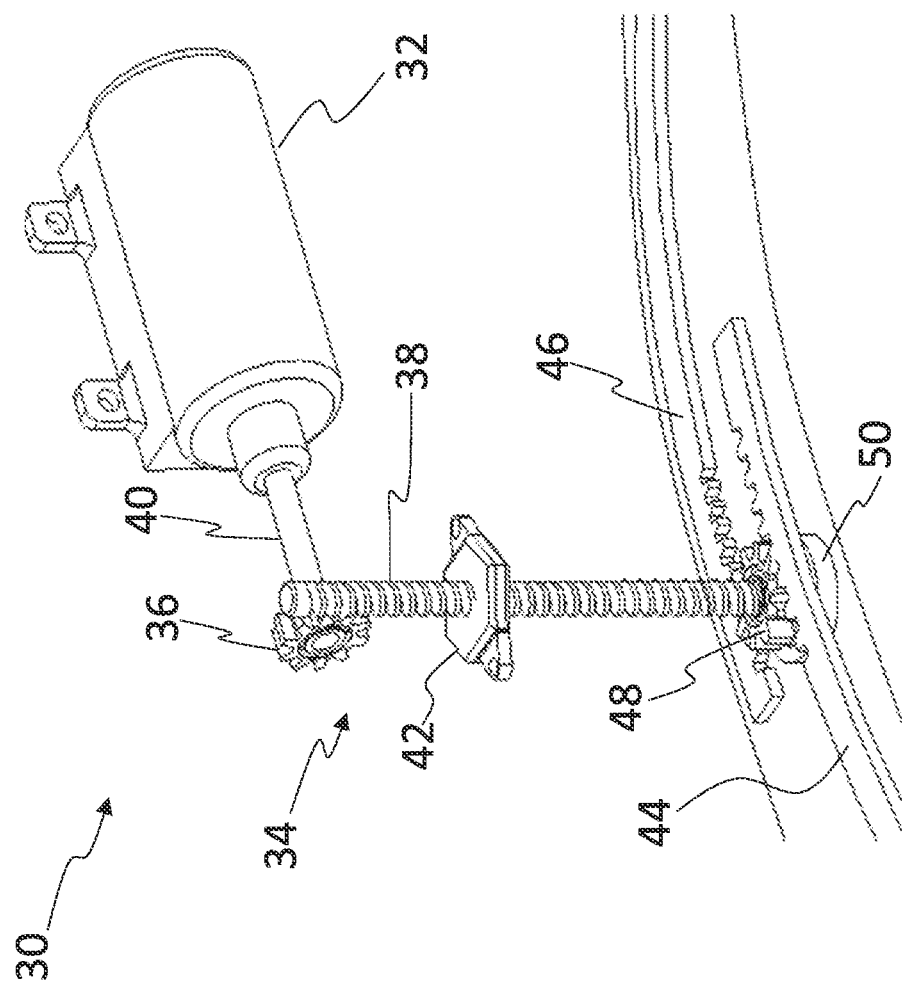
FIG. 4 illustrates a detailed view of some of the components of the wheel chock system in FIG. 2.

FIG. 4 illustrates a detailed view of some of the components of the wheel chock system 10 in FIG. 2. In particular, FIG. 4 illustrates components of the actuator 30. As can be seen in FIG. 4, the actuator 30 comprises a motor 32. The motor 32 may suitably be a bi-directional motor 32. Thus, the motor 32 may rotate in one direction in order to move the wheel chocks 12, 14 (not illustrated in FIG. 4; see FIGS. 2, 3a-c instead) from the inactivated position to the activated position, and in the opposite direction in order to move the wheel chocks 12, 14 from the activated position to the inactivated position. As can be seen in FIG. 4, the actuator 30 also comprises a gear mechanism 34 which is operatively engaged with the motor 32 for transferring the rotational motion of the motor 32 to an advancing motion of the wheel chocks 12, 14 for moving the wheel chocks 12, 14 from the inactivated position to the activated position (or a retracting motion for moving the wheel chocks 12, 14 from the activated position to the inactivated position).

The bi-directional motor 32 may, via the gear mechanism 34, move both wheel chocks 12, 14 simultaneously. In particular, the front wheel chock 12 may be moved along the front side of the tyre 18, so that when moved from the inactivated position to the activated position it will arrive at the front side of the tyre 18 at the tyre-ground interface. At the same time the rear wheel chock 14 may be moved along the rear side of the tyre 18 to arrive at the tyre-ground interface at the rear side of the tyre 18.

As can be seen in FIG. 4, the gear mechanism 34 comprises a worm wheel 36 and a worm shaft 38. The worm wheel 36 is, in this example, concentrically engaged with a drive shaft 40 of the motor 32. The axis of rotation of the worm wheel 36 is perpendicular to the axis of rotation of the worm shaft 38. The worm wheel 36 is provided with cogs for engaging threads of the worm shaft 38. As should be understood, the bi-directional motor 32 can rotate the worm wheel 36, which in turn rotates the worm shaft 38. The worm shaft 38 extends through a nut 42, which has internal threads that engage the external threads of the worm shaft 38. The nut 42 may suitably be held in a fixed position, such as being fixed relative to the chassis of the vehicle. Hereby, rotation of the worm shaft 38 will cause the worm shaft 38 to move in the vertical direction. In other words, the worm shaft 38 will move vertically relative to the fixed nut 42. Thus, if the drive shaft 40 of the motor 32 and the worm wheel 36 rotates in one direction, the worm shaft 38 will move downwards, i.e. in a direction towards the ground 16 (the ground is indicated in FIG. 2), and if the drive shaft 40 and the worm wheel 36 rotate in the opposite direction, then the worm shaft 38 will move upwards, i.e. in a direction away from the ground 16.

As can be seen in FIG. 4, the gear mechanism 34 also comprises a pair of strips 44, 46 having teeth. The gear mechanism 34 also comprises a strip-engaging gear part 48, which may be a wheel-like part similar to the worm wheel 36. The strip-engaging gear part 48 may in such case be fixedly connected to the worm shaft 38, in particular, concentrically with the worm shaft 38 as shown in FIG. 4. However, in other exemplary embodiments, the strip-engaging gear part 48 may form part of the worm shaft 38. In either case, the strip-engaging gear part 48 will follow the rotating and vertical movements of the worm shaft 38. The strip-engaging gear part 48 is suitably provided with cogs or other similar protruding elements that engage the teeth of each strip 44, 46. When the strip-engaging gear part 48 rotates with the worm shaft 38, the strips 44, 46 will be fed in a circumferential direction relative to the tyre 18. More specifically, the two strips 44, 46 will be fed in mutually opposite direction, one of the strips 46 will be fed clockwise, while the other strip 44 will be fed counter-clockwise.

As best seen in the sequence of FIGS. 3a-3c, each wheel chock 12, 14 is connected to a respective one of said two strips 44, 46. Thus, the front wheel chock 12 is connected to what may be referred to as the front strip 44, and the rear wheel chock 14 is connected to what may be referred to as the rear strip 46. As can be understood from FIGS. 3a-3c and FIG. 4, movement from the inactivated position (FIG. 3a) to the activated position (FIG. 3c) is caused by the motor 32 setting the gear mechanism 34 in motion such that one of the strips 44 (the front strip 44) is moved along a curved path following the circumference of the front side of the tyre 18, while the other strip 46 (the rear strip 46) is moved along a curved path following the circumference of the rear side of the tyre 18.

As can be seen in FIG. 3b and as indicated by the single thin downwards pointing black arrow, the rotation of the worm shaft 38 will cause a vertical displacement of the worm shaft 38 which is transmitted to the wheel chocks 12, 14, via the strip-engaging gear part 48 (FIG. 4) and the strips 44, 46. Thus, the vertical distance that the wheel chocks 12, 14 travel will be partly attributed to the vertical movement of the worm shaft 38. However, the rotation of the worm shaft 38 also induces the feeding of the strips 44, 46 from a retracted state in the inactivated position of the wheel chocks 12, 14 to an advanced state in the activated position of the wheel chocks 12, 14. The advancement of the strips 44, 46 in their respective circumferential directions about the tyre 18 is illustrated in FIG. 3b by the two thick black curved arrows. As will be understood, the vertical distance that the wheel chocks 12, 14 travel will be partly attributed to the feeding advancement of the strips 44, 46. Similarly, when the wheel chocks 12, 14 are to be moved from the activated position to the inactivated position, the opposite movements of the gear mechanism 34 will be made, i.e. the strips 44, 46 will be retracted and the worm shaft 38 will be lifted (and so will the strips 44, 46 and the strip-engaging gear part 48). As illustrated in FIGS. 3a-3c the wheel chocks 12, 14 may suitably be connected to end portions of the respective strips 44, 46.

As illustrated in FIG. 4, the wheel chock system 10 may further comprise a bearing 50 which provides support to the two strips 44, 46 and to the strip-engaging gear part 48. The bearing 50 follows the vertical movements of the strip-engaging gear part 48, and thus holds the gear mechanism 34 together as a "package" in the vertical movement.

As indicated in FIGS. 3a-3c, the wheel chock system 10 may further comprise a casing 52 for housing the strips 44, 46 in the inactivated position of the wheel chocks 12, 14 and/or for guiding the strips 44, 46 along the curved paths. The casing 52 may suitably be formed as one or more curved sheaths which define the circumferential direction along which the strips 44, 46 are guided and fed. As can be seen in FIGS. 3a-3c, the casing 52 may extend a relative short distance in the circumferential direction around the tyre 18, such that when the strips 44, 46 are being advanced (to bring the wheel chocks 12, 14 to the activated position) they will project out from the casing 52. Nevertheless, the circumferential extension of the casing 52 may suitably be such that when the strips 44, 46 have been retracted (and have brought the wheel chocks 12, 14 to the inactivated position), substantially the whole length of the strips fit within the casing.

Figure 5:
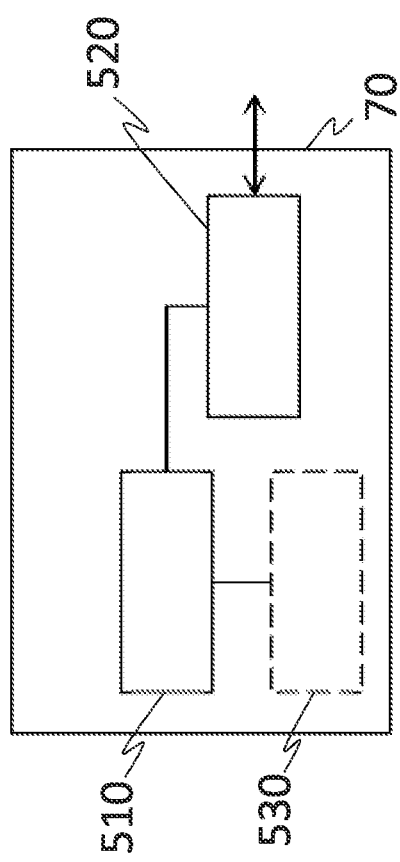
FIG. 5 illustrates schematically a control unit that may be implemented in a wheel chock system of the present disclosure.

FIG. 5 schematically illustrates a control unit 70 according to at least one exemplary embodiment of the invention. In particular, FIG. 5 illustrates, in terms of a number of functional units, the components of a control unit 70 according to exemplary embodiments of the discussions herein. The control unit 70 may be comprised in a wheel chock system 10 such as the one illustrated in FIG. 2 and/or in a vehicle 1 such as the one exemplified in FIG. 1. Processing circuitry 510 may be provided using any combination of one or more of a suitable central processing unit CPU, multi-processor, microcontroller, digital signal processor DSP, etc., capable of executing software instructions stored in a computer program product, e.g. in the form of a storage medium 530. The processing circuitry 510 may further be provided as at least one application specific integrated circuit ASIC, or field programmable gate array FPGA.

Particularly, the processing circuitry 510 is configured to cause the control unit 70 to perform a set of operations, or steps, such as previously discussed. For example, the storage medium 530 may store the set of operations, and the processing circuitry 510 may be configured to retrieve the set of operations from the storage medium 530 to cause the control unit 70 to perform the set of operations. The set of operations may be provided as a set of executable instructions. Thus, the processing circuitry 510 is thereby arranged to execute exemplary operation as herein disclosed.

The storage medium 530 may also comprise persistent storage, which, for example may be any single one or combination of magnetic memory, optical memory, solid state memory or even remotely mounted memory.

The control unit 70 may further comprise an interface 520 for communications with at least one external device such as a bi-directional motor 32 driving a gear mechanism 34, a speed sensor, a parking brake sensor, a propulsion motor or engine, etc. As such, the interface 520 may comprise one or more transmitters and receivers, comprising analogue and digital components and a suitable number of ports for wireline or wireless communication.

The processing circuitry 510 controls the general operation of the control unit 70, e.g. by sending data and control signals to the interface 520 and the storage medium 530, by receiving data and reports from the interface 520, and by retrieving data and instructions form the storage medium 530. Other components, as well as the related functionality, of the control unit 70 are omitted in order not to obscure the concepts presented herein.

Figure 6:
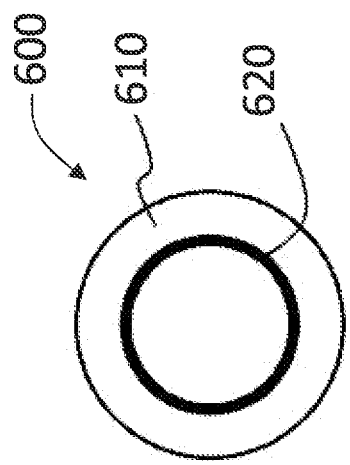
FIG. 6 illustrates schematically a computer program product that may be implemented in a wheel chock system of the present disclosure.

FIG. 6 schematically illustrates a computer program product 600 according to at least one exemplary embodiment of the invention. More specifically, FIG. 6 illustrates a computer readable medium 610 carrying a computer program comprising program code means 620 for performing the operations discussed herein with respect to the control unit 70, when said program product is run on a computer. The computer readable medium 610 and the program code means 620 may together form the computer program product 600.

The invention claimed is:

1. A wheel chock system, comprising:
a pair of wheel chocks for preventing motion of a wheel of a vehicle,
an actuator configured to move the pair of wheel chocks from an inactivated position in which the wheel chocks do not prevent wheel motion, to an activated position in which one of the pair of wheel chocks prevents forward motion of the wheel and the other one of the pair of wheel chocks prevents rearward motion of the same wheel, and
a control unit for controlling the actuator, wherein the control unit is configured to:
receive an operator-initiated activation request when the pair of wheel chocks is in the inactivated position,
determine that a plurality of predefined conditions are met, the plurality of predefined conditions comprising that a brake has been engaged and that the propulsion power for driving a drive shaft or wheels of the vehicle has been turned off, and
upon determination that the plurality of predefined conditions are met and the operator-initiated activation request has been received, cause the actuator to move the wheel chocks from the inactivated position to the activated position.

2. The wheel chock system of claim 1, wherein the plurality of predefined conditions comprise:
that the vehicle speed is zero, and
that the brake has been engaged.

3. The wheel chock system of claim 1, wherein the control unit is configured to:
receive input signals indicative of whether or not the predefined conditions are being met,
receive a request signal representing the operator-initiated activation request, and
based on the received input signals and the request signal, send an actuator signal to the actuator to cause the actuator to move the wheel chocks from the inactivated position to the activated position.

4. The wheel chock system of claim 1, wherein the control unit is configured to:
receive an operator-initiated inactivation request when the pair of wheel chocks is in the activated position, and
upon receipt of the operator-initiated inactivation request, cause the actuator to move the wheel chocks from the activated position to the inactivated position.

5. A wheel chock system, comprising:
a pair of wheel chocks for preventing motion of a wheel of a vehicle,
an actuator configured to move the pair of wheel chocks from an inactivated position in which the wheel chocks do not prevent wheel motion, to an activated position in which one of the pair of wheel chocks prevents forward motion of the wheel and the other one of the pair of wheel chocks prevents rearward motion of the same wheel, and
a control unit for controlling the actuator, wherein the control unit is configured to:
receive an operator-initiated activation request when the pair of wheel chocks is in the inactivated position,
determine that a plurality of predefined conditions are met, and
upon determination that the plurality of predefined conditions are met and the operator-initiated activation request has been received, cause the actuator to move the wheel chocks from the inactivated position to the activated position,
wherein the actuator comprises a bi-directional motor and a gear mechanism,
wherein the bi-directional motor is configured to, via the gear mechanism, simultaneously:
move one of the pair of wheel chocks to the activated position, at a front side of a tyre carried by the wheel at a tyre-ground interface, and
move the other one of the pair of wheel chocks to the activated position, at a rear side of the tyre at the tyre-ground interface,
wherein the gear mechanism comprises a pair of strips having teeth,
wherein each wheel chock of the pair of wheel chocks is connected to a respective one of the pair of strips, and
wherein movement from the inactivated position to the activated position is caused by the motor setting the gear mechanism in motion such that one strip of the pair of strips is moved along a curved path following the circumference of the front side of the tyre while the other strip of the pair of strips is moved along a curved path following the circumference of the rear side of the tyre.

6. The wheel chock system of claim 5, wherein the wheel chocks are connected to end portions of the respective strips.

7. The wheel chock system of claim 5, wherein the gear mechanism further comprises a worm wheel and a worm shaft,
wherein the bi-directional motor is configured to rotate the worm wheel which in turn rotates the worm shaft, and
wherein the worm shaft moves vertically when being rotated by the worm wheel, the vertical motion of the worm shaft being transferred to the pair of strips.

8. The wheel chock system of claim 7, further comprising a nut in threaded engagement with the worm shaft,
wherein the nut is configured to be fixedly attached to a chassis of the vehicle, and
wherein when the worm shaft rotates relative to the nut, the worm shaft moves vertically relative to the nut.

9. The wheel chock system of claim 7, wherein the gear mechanism further comprises a strip-engaging gear part which is fixedly connected to the worm shaft or which forms part of the worm shaft,
wherein the strip-engaging gear part follows the rotating and vertical movements of the shaft,
wherein the strip-engaging gear part is engaged with the teeth of each strip, and
wherein when the strip-engaging gear part rotates, the strips are fed along the respective ones of the curved paths.

10. The wheel chock system of claim 9, further comprising a bearing providing support to the pair of strips and to the strip-engaging gear part, wherein the bearing follows the vertical movements of the strip-engaging gear part.

11. The wheel chock system of claim 5, further comprising a casing for housing the pair of strips in the inactivated position of the pair of wheel chocks and/or for guiding the pair of strips along the curved paths.

12. A wheel chock system, comprising:
a pair of wheel chocks for preventing motion of a wheel of a vehicle, and
an actuator configured to move the pair of wheel chocks from an inactivated position in which the wheel chocks do not prevent wheel motion, to an activated position in which one of the pair of wheel chocks prevents forward motion of the wheel and the other one of the pair of wheel chocks prevents rearward motion of the same wheel, wherein the actuator comprises a bi-directional motor and a gear mechanism, wherein the bi-directional motor is configured to, via the gear mechanism, simultaneously:
move one of the pair of wheel chocks to the activated position, at a front side of a tyre carried by the wheel at a tyre-ground interface, and
move the other one of the pair of wheel chocks to the activated position, at a rear side of the tyre at the tyre-ground interface,
wherein the gear mechanism comprises a pair of strips having teeth,
wherein each wheel chock of the pair of wheel chocks is connected to a respective one of the pair of strips, and
wherein movement from the inactivated position to the activated position is caused by the motor setting the gear mechanism in motion such that one strip of the pair of strips is moved along a curved path following the circumference of the front side of the tyre while the other strip of the pair of strips is moved along a curved path following the circumference of the rear side of the tyre.

13. The wheel chock system of claim 12, further comprising:
a control unit for controlling the actuator, wherein the control unit is configured to:
receive an operator-initiated activation request when the pair of wheel chocks is in the inactivated position, and
determine that a plurality of predefined conditions are met, and
upon determination that the plurality of predefined conditions are met and the operator-initiated activation request has been received, cause the actuator to move the wheel chocks from the inactivated position to the activated position.

14. A vehicle comprising the wheel chock system of claim 1.

15. A wheel chock system, comprising:
a pair of wheel chocks for preventing motion of a wheel of a vehicle,
an actuator configured to move the pair of wheel chocks from an inactivated position in which the wheel chocks do not prevent wheel motion, to an activated position in which one of the pair of wheel chocks prevents forward motion of the wheel and the other one of the pair of wheel chocks prevents rearward motion of the same wheel, and
a control unit for controlling the actuator, wherein the control unit is configured to:
receive an operator-initiated activation request when the pair of wheel chocks is in the inactivated position,
determine that a plurality of predefined conditions are met,
upon determination that the plurality of predefined conditions are met and the operator-initiated activation request has been received, cause the actuator to move the wheel chocks from the inactivated position to the activated position,
receive a road gradient signal indicative of the gradient of the road on which the vehicle is standing, and
upon determination by the control unit that the gradient is above a predetermined limit, send an alert signal to a driver interface for alerting the driver of the possibility to activate the wheel chocks or automatically cause the actuator to move the wheel chocks from the inactivated position to the activated position provided that the plurality of predefined conditions are met.

\* \* \* \* \*